United States Patent [19]
Johnson et al.

[11] Patent Number: 5,357,626
[45] Date of Patent: Oct. 18, 1994

[54] PROCESSING SYSTEM FOR PROVIDING AN IN CIRCUIT EMULATOR WITH PROCESSOR INTERNAL STATE

[75] Inventors: William M. Johnson; David B. Witt, both of Austin, Tex.

[73] Assignee: Advanced Micro Devices, Inc., Sunnyvale, Calif.

[21] Appl. No.: 139,607

[22] Filed: Oct. 20, 1993

Related U.S. Application Data

[63] Continuation of Ser. No. 743,679, Aug. 12, 1991, abandoned.

[51] Int. Cl.⁵ .................... G06F 11/00; G01R 31/28
[52] U.S. Cl. ..................... 395/500; 371/16.1; 371/16.5; 371/19; 371/16.2
[58] Field of Search .............. 371/16.1, 16.5, 19, 371/16.2; 395/500

[56] References Cited

U.S. PATENT DOCUMENTS

| | | | |
|---|---|---|---|
| 4,553,201 | 11/1985 | Pollack, Jr. ................. | 371/16.1 |
| 4,569,048 | 2/1986 | Sargent .................. | 371/16.1 |
| 4,670,838 | 6/1987 | Kawata ................... | 364/200 |
| 4,674,089 | 6/1987 | Poret et al. ............... | 371/25 |
| 4,691,316 | 9/1987 | Phillips .................. | 371/20 |
| 4,933,941 | 6/1990 | Eckard et al. ............. | 371/16.2 |
| 4,954,942 | 9/1990 | Masuda et al. ............. | 395/500 |
| 5,056,013 | 10/1991 | Yamamoto ................ | 395/500 |
| 5,068,852 | 11/1991 | Locke ................... | 371/16.2 |
| 5,115,502 | 5/1992 | Tallman ................. | 395/500 |
| 5,132,971 | 7/1992 | Oguma et al. ............. | 371/18.3 |
| 5,163,052 | 11/1992 | Evans et al. ............. | 371/18 |
| 5,168,559 | 12/1992 | Tamura .................. | 395/500 |
| 5,243,601 | 9/1993 | Tague et al. ............. | 371/16.1 |
| 5,313,618 | 5/1994 | Pawloski ................ | 395/500 |

FOREIGN PATENT DOCUMENTS 2200482 8/1988 United Kingdom .

OTHER PUBLICATIONS

Johnson, M., System Considerations in the Design of the AM29000, *IEEE Micro*, 7:28–41 (1987).

Primary Examiner—Robert B. Harrell
Assistant Examiner—Timothy L. Philipp
Attorney, Agent, or Firm—Foley & Lardner

[57] ABSTRACT

A processing system is configured for providing an external in circuit emulator with an internal execution state resulting from the execution by a first processor of an internal instruction stored in an internal instruction cache. The processing system includes a second processor which includes an internal instruction cache for also storing the internal instructions. The second processor is coupled to the first processor in a master/slave configuration to enable the second processor to duplicate the instruction executions of the first processor. The second processor includes an output for providing the internal execution state which is coupled to the in circuit emulator by an external address bus for providing the internal execution parameter to the in circuit emulator.

22 Claims, 3 Drawing Sheets

PROCESSING SYSTEM FOR PROVIDING AN IN CIRCUIT EMULATOR WITH PROCESSOR INTERNAL STATE

This is a continuation of application Ser. No. 07/743,679 filed Aug. 12, 1991, now abandoned.

BACKGROUND OF THE INVENTION

The present invention is generally directed to an arrangement for verifying, with an in circuit emulator, the instructions to be executed by a processor of a processing system. The present invention is more particularly directed to such an arrangement wherein the processor includes an internal instruction cache for storing internal instructions and wherein internal execution parameters, resulting from the execution of internal instructions by the processor, are made available to the in circuit emulator.

Processing systems are well known in the art. Such systems generally include a processor and an external memory. A program counter of the processor provides a series of memory addresses which are used by the processor for fetching instructions stored in the external memory to obtain the instructions. For each memory address, the processor conveys the memory address to the external memory over an external address bus and the external memory responds by conveying to the processor over an external instruction/data bus the instruction stored in the corresponding addressed memory location.

One well known form of processor is known in the art as a reduced instruction set computer (RISC) processor. Generally, this type of processor performs four operations in sequence for each instruction. The first operation is a fetch operation to obtain the instruction from the external memory. The second operation is a decode operation wherein the processor decodes the instruction. The third operation is an execute operation wherein the processor executes the instruction and the fourth operation is a write-back operation where the processor writes a resultant from the execution back to the external memory.

Such a processor also generally employs a pipelined architecture to permit parallel processing. Such processing permits the processor to operate on more than one instruction at a time. For example, while the processor is fetching an instruction, it may also decode a previously fetched instruction, execute a still previously fetched instruction, and write-back a resultant from executing a still further previously fetched instruction. The processor generally operates off of a clock and performs each operation during a single clock cycle unless the pipeline is held by, for example, a trap or an exception condition.

Hence, for each instruction, the processor executes four operations; fetch, decode, execute, and write-back. As can also be appreciated, the instructions stored in the external memory constitute the program for the processor.

During program development, it is advantageous to verify the correctness of the program instructions stored in the external memory to be executed by the processor. Such program verification, referred to as debugging, can employ an in circuit emulator. In circuit emulators are well known in the art and are used to track the execution of a processor. To do so, the in circuit emulator includes a duplicate of the program instructions in its own memory and receives from the processor, the external memory fetch addresses, the obtained instructions and data, and execution status signals. Hence, the in circuit emulators receive the external activity or state of the processor.

The foregoing debugging operation works well except for executions of the processor which result from instructions obtained by the processor from an internal instruction cache. The use of such internal caches is increasing because a fetch to an internal cache by a processor takes less time than a fetch to external memory. Unfortunately, when a fetch to an internal cache takes place, there is no external activity for the in circuit emulator to monitor except possibly for a status signal from the processor indicating a non-sequential fetch to the internal cache. In the prior art, in order to track all of the state of the processor, the instructions stored in the internal cache had to be duplicated in the in circuit emulator. This required additional debugging time, effort, and resources and such disadvantages are only worsened with internal caches of increased size.

By virtue of the present invention, all states of a processor can be provided to an in circuit emulator without duplicating the internally stored processor instructions in the in circuit emulator. In addition, as will be seen hereinafter, precise processor state and execution status can be provided to an in circuit emulator even when the processor is operating at a rate which is a multiple of the external memory operating rate.

SUMMARY OF THE INVENTION

The invention provides a system for providing, externally to a first processor, an internal execution parameter resulting from the execution by the first processor of internal instructions stored in an internal instruction cache of the first processor. The system includes a second processor including an internal instruction cache for also storing the internal instructions. The second processor is coupled to the first processor in a master/slave configuration to enable the second processor to duplicate the instruction executions of the first processor and includes an output for providing the internal execution parameter. The system further includes external bus means coupled to the second processor output and being external to the first and second processors for providing the execution parameter externally to the first and second processors.

The invention further provides an arrangement for verifying, with an in circuit emulator the instructions to be executed by a processor wherein the instructions to be executed include external instructions stored in an addressable external memory and internal instructions stored in an addressable internal instruction cache. The arrangement is arranged to provide the in circuit emulator with an internal execution parameter resulting from the execution of the internal instructions and includes a first processor including an address output for providing external memory addresses for fetching the external instructions stored in the external memory, an instruction input for receiving the external instructions fetched from the external memory, an internal instruction cache for storing the internal instructions, and a first status output coupled to the in circuit emulator for providing the in circuit emulator with execution status signals corresponding to the execution of the external and internal instructions. The arrangement further includes a first external address bus coupling the first processor address output to the external memory and to the in circuit emulator and an external instruction bus coupling the first processor instruction input and the in circuit emulator to the external memory. The arrangement further includes a second processor including an instruction input coupled to the external instruction bus and an internal instruction cache for storing the internal instructions. The first and second processors are arranged in a master/slave configuration to enable the second processor to duplicate the executions of the first processor of the external and internal instructions. The second processor further includes an address output coupled to the in circuit emulator for providing the in circuit emulator with the internal execution parameter.

The second processor may also include a second status output coupled to the in circuit emulator for providing the in circuit emulator with status signals indicative of the execution status of the instruction executions of the processors. The first and second processors are configurable for executing instructions at an operating rate which is a multiple of the operating rate of the external memory and the second processor is configurable for providing, at the second status output, the status signals indicative of the execution status of the processors for each operating cycle of the processors.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompany drawing, in the several figures of which like reference characters identify identical elements, and wherein:

DESCRIPTION OF THE PREFERRED EMBODIMENT

Figure 1:
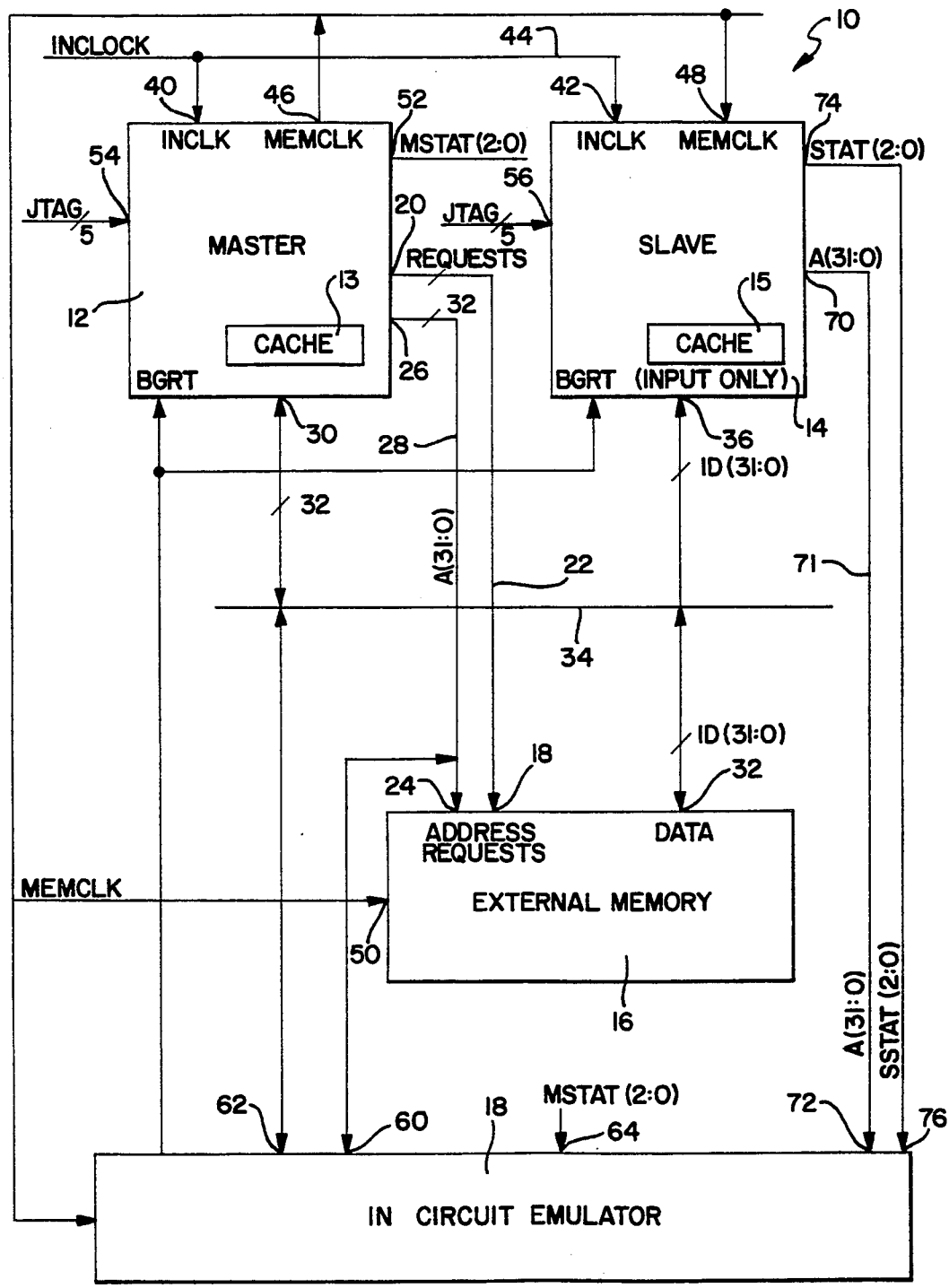
FIG. 1 is a block diagram of a system embodying the present invention including first and second processors coupled together in a master/slave configuration.

Referring now to FIG. 1, it illustrates a system 10 embodying the present invention. The system 10 generally includes a first processor 12, a second processor 14, an external instruction/data memory 16, and an in circuit emulator 18. As will be seen hereinafter, the system 10 is configured to permit the in circuit emulator 18 to verify the execution by the processors 12 and 14 of the execution instructions to be executed by the processors. To that end, and as will be more fully described hereinafter, the first processor 12 and second processor 14 are coupled together in a master/slave configuration to permit the second processor 14, which is the slave processor, to duplicate the instructions performed by the first processor 12, which is the master processor.

The external memory 16 is of the type which stores instructions to be executed by the processors, data required by the processors in their executions, and resultants which are written back to the external memory 16. The instructions, data, and resultants are stored in addressable storage locations of the external memory 16 and are addressable by the first processor 12 to permit processor 12 to fetch the instructions and data and to store resultants. To that end, the external memory 16 includes a multiple-bit REQUESTS input 18 which is coupled to a multiple-bit REQUESTS output 20 of the first processor 12 by an external control bus 22. The requests generated by the first processor 12 indicate to the external memory 16 whether an access to the external memory is a load access for fetching instruction or data or a store access for storing a resultant. The external memory 16 further includes a 32-bit address input 24 which is coupled to a 32-bit address output 26 of the first processor 12 by an external address bus 28. For each access to the external memory 16 the first processor 12 generates an address at the address output 26 which is conveyed to the external memory by the external address bus 28 for fetching the instructions or data stored in the external memory 16 at the corresponding address or for storing a resultant at the corresponding memory address of the external memory 16. For receiving an instruction or data from the external memory 16 or for providing a resultant to the external memory 16, the first processor 12 includes a multiple-bit instruction/data port 30 which is coupled to a multiple-bit external memory instruction/data port 32 of the memory 16 by an external instruction/data bus 34.

To enable the second processor 14 to duplicate the executions of the first processor 12, the second processor 14 includes a multiple-bit instruction/data input 36 which is coupled to the external instruction/data bus 34. The input 36 is an input only and the system 10 is configured so that only the first processor 12 addresses the external memory 16 for fetching instructions and data for both processors.

To control system timing, the first processor 12 includes a clock input 40 and the second processor 14 includes a clock input 42. The clock inputs 40 and 42 are coupled together by an INCLOCK line 44 which is adapted to be coupled to an external clock source (not shown). To further control system timing, the first processor 12 is preferably arranged to derive from the clock pulses received at input 40 a memory clock which is provided at an output 46. Preferably, processor 12 is of the type which is arranged for generating memory clock pulses at a rate which is equal to the processing rate of the processors 12 and 14 corresponding to a 1× mode of operation or at a rate which is one half the processing rate of the processors 12 and 14 corresponding to a 0.5× mode of operation. Such a processor is fully disclosed in copending application Ser. No. 07/647,491 filed Jan. 28, 1991 for Microprocessor Synchronous Timing System in the names of the inventors herein, which application is assigned to the assignee of the present invention and which is incorporated herein by reference. The memory clock pulses provided by the first processor 12 are conveyed from output 46 to a memory clock input 48 of the second processor 14 and to a memory clock input 50 of the external memory 16.

The first processor 12 and second processor 14 further include a 5-bit JTAG (Joint Test Action Group) input 54 and 56 respectively which, as well known in the art, may be utilized for setting the first and second processors 12 and 14 respectively into the master/slave configuration as contemplated by the present invention. JTAG inputs, as well known, are becoming standard in logic devices and microprocessors to allow an asynchronous boundary scan chain to connect all the inputs and outputs of such devices together and make them addressable. It also allows special test instructions or modes to be defined and implemented while using the standard protocol to enable them. Hence, it is a convenient way to change the mode of a processor, as for example, to move the processor to the slave tracking state as contemplated by the present invention without requiring special external logic or pins. Hence, as will be appreciated by those skilled in the art, the JTAG inputs 54 and 56 may also be utilized for placing the microprocessors 12 and 14 into other modes of operation as well.

As thus far described, the microprocessors 12 and 14 are configured for executing instructions stored externally in the external memory 16. To permit the in circuit emulator 18 to track the execution of such external instructions, the in circuit emulator 18 includes a multiple-bit address input 60 which is coupled to the external address bus 28 and an instruction/data input 62 which is coupled to the external instruction/data bus 34. To further permit the in circuit emulator to track the executions of the first processor 12, the first processor 12 includes a 3-bit status output 52 which is coupled to a first 3-bit status input 64 of the in circuit emulator 18. The 3-bit status signals provided at the status output 52 as well known in the art can provide a great degree of information as to the state of execution of the processor 12. The three status bits may provide, for example, information as to the state of execution as indicated in the table below.

| STAT | CYCLE |
| --- | --- |
| 000 | Halt or Step |
| 001 | Pipeline Hold |
| 010 | Load Test Instruction |
| 011 | Wait Mode |
| 100 | Interrupt Return |
| 101 | Taking Interrupt or Trap |
| 110 | Non-sequential Fetch |
| 111 | Executing Mode |

As thus far described, the system 10 is capable of providing the in circuit emulator 18 with sufficient information to track the executions of the processors 12 and 14 of external instructions stored in the external memory 16. However, as will be noted in FIG. 1, each of the processors 12 and 14 includes an internal instruction cache 13 and 15 respectively. Such internal instruction caches are provided within processors because an access to an internal cache generally requires less time than accesses to external memory. Unfortunately, when a processor accesses an internal cache, there is no detectable external activity generated by a processor. Prior to the present invention, the only way that an in circuit emulator could track internal executions of internally stored instructions, was to totally duplicate the internal instructions stored within an internal cache within the in circuit emulator. However, and as will be seen hereinafter, since the processors 12 and 14 are coupled together in a master/slave configuration, the second processor 14 is able to provide the in circuit emulator 18 with internal execution parameters resulting from the processors executing internal instructions stored within the internal instruction caches 13 and 15. For decode, such an internal execution parameter may be program counter value, absolute register file number on a read or a virtual address of a load/store. In writeback, such an execution parameter could be a data element driven into the register file on a write, or an absolute register file number on a write. In accordance with the preferred embodiment, the internal execution parameter to be provided by the processor 14 is the address of the internal caches 13 and 15 for a non-sequential fetch to the internal caches. This, when combined with the information of when the pipeline is advanced, stalled, branching, or taking a trap, can give the in circuit emulator the instruction trace information it needs.

The second or slave processor 14 provides the non-sequential fetch address at its multiple-bit address output 70. The address output 70 is coupled to a second address input 72 of the in circuit emulator by another external address bus 71. As will be seen with respect to FIG. 2, each time the processors 12 and 14 first access their internal caches 13 and 15 respectively, the second processor 14 will provide at its output 70 the exact address of the internal cache storage location being addressed. Such non-sequential addresses are known in the art as jump addresses. Also, as will be seen with respect to FIG. 2, the second processor 14 will continue to provide the current non-sequential fetch address until the next non-sequential fetch occurs.

In the master/slave configuration, both processors 12 and 14 execute the program from external memory 16 at the same time, but only the master processor 12 is allowed to drive the external bus. This is accomplished by tieing all the inputs and outputs of the two processors together and by setting processor 14 into the slave mode through the JTAG input 56 to prevent it from ever driving an output value. As a result, both processors run the same program, but only processor 12 drives the value for stores to the external memory 16. Because of this relationship, the address bus 71 of the slave processor 14 is not needed for instruction fetches, loads, and stores, since the master processor 12 drives the value.

In addition to the foregoing, the second processor 14 also includes a 3-bit status output 74 which is coupled to a second status input 76 of the in circuit emulator. When the processors 12 and 14 are operating in the 1× mode (when the processor operating rate is equal to the external memory operating rate) the status signals provided at the status output 74 will be identical to the status signals provided at the status output 52 of the first processor 12. However, when the processors 12 and 14 are operating in the 0.5× mode (when the processor operating rate is twice the operating rate of the external memory) the status signals provided at output 74 can be modified by encoding in a manner as will be appreciated by those skilled in the art to provide, for example, the information illustrated in the table below.

| STAT | Cycle i | Cycle i + 1 |
| --- | --- | --- |
| 000 | pipehold | pipehold |
| 001 | pipehold | executing |
| 010 | executing | pipehold |
| 011 | executing | executing |
| 100 | pipehold | branch |
| 101 | branch | pipehold |
| 110 | executing | branch |
| 111 | branch | executing |

In the 0.5× mode, the first processor 12 will continue to provide at its status output 52 the execution status for each operating cycle of the external memory 16. However, the second processor 14 will provide at its status output 74 status signals indicative of the execution status of the processor for each operating cycle of the processors. As can be seen from the table above, in the 0.5× mode, the processors will execute two operating cycles for each operating cycle of the external memory. As a result, the status output 74 of the second processor 14, when the processors are operating in the 0.5× mode, will reflect the exact execution status of the processors 12 and 14. By virtue of these status signals at output 74 and the corresponding jump or non-sequential fetch addresses provided at output 70, the in circuit emulator 18 is provided with an exact cycle by cycle breakdown of the instruction stream of the processors 12 and 14 without physically duplicating the entire instruction caches externally. This therefore provides a high degree of accuracy and visibility of the microprocessor executions for verifying the instructions to be executed by the processors.

Figure 2:
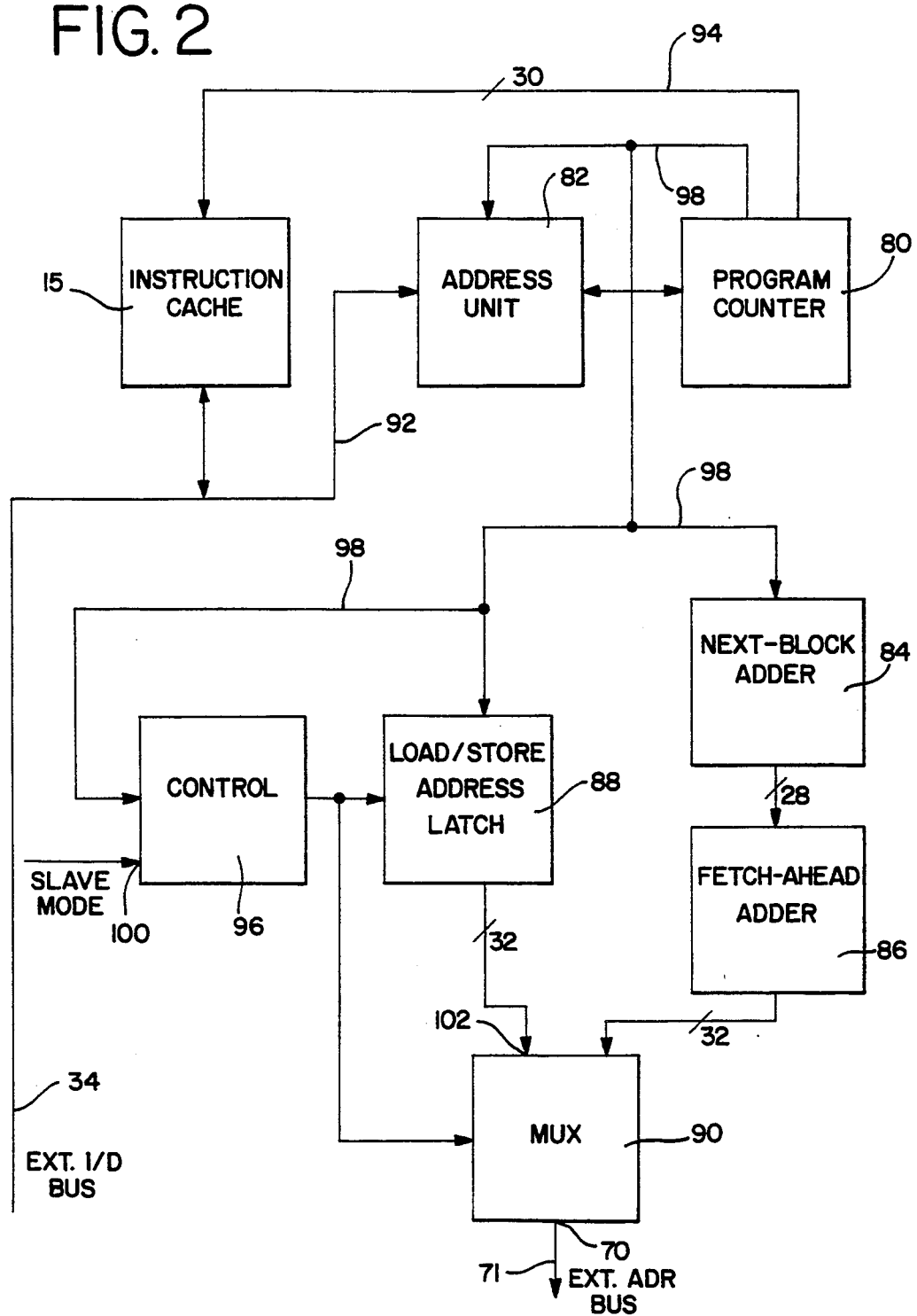
FIG. 2 is a block diagram of a portion of the slave microprocessor illustrating the manner in which the internal execution parameter is provided by the slave processor externally to the master and slave processors.

Referring now to FIG. 2, it illustrates in greater detail the manner in which the second processor 14 provides the non-sequential jump addresses to its external address bus 71 when the processors 12 and 14 issue a non-sequential address for accessing the internal caches 13 and 15. The internal cache of the second processor 14 is referenced in FIG. 2 by the reference character 15. Common to both processors are a program counter 80, an address unit 82, a next block adder 84, a fetch-ahead adder 86, a latch 88, a multiplexer 90, an internal instruction bus 92 and a second internal address bus 94.

The program counter 80 generates an initial address which is utilized by the next-block adder 84 and the fetch-ahead adder 86 to generate sequential addresses within address blocks of the external memory 16. When an instruction is received on the external instruction/data bus 34 which requires a non-sequential fetch, the address unit 82 sets the program counter 80 to the non-sequential fetch address which is conveyed to the instruction cache 15 over the second internal address bus 94.

To control the provision of the non-sequential jump address by the second processor 14, the second processor 14 includes a control means 96. The program counter 80 is coupled to the control means 96 and the latch 88 by a first internal address bus 98.

The control means 96 includes a control input 100 which is set when the JTAG input 56 is set to condition the second processor 14 for master/slave operation. When a non-sequential fetch address is provided by the program counter 80, the non-sequential address is conveyed to the latch 88 and the control means 96 by the first internal address bus 98. Responsive to receiving the non-sequential fetch address, the control means 96 causes the non-sequential address to be latched in the latch 88. The control means 96 also is coupled to the multiplexer 90 and causes the multiplexer to select input 102 for conveying the non-sequential address from the latch 88 through the multiplexer 90 and onto the external address bus 71 couple to the second processor 14. The non-sequential address is held on the bus 71 until the next non-sequential address is provided by the program counter 80 and detected by the control means 96. As a result, even though an internal instruction is fetched by the processors from the internal instruction caches resulting in internal execution of the instruction and no external activity by the first processor 12, the second processor 14 is arranged to provide the internal jump address to the in circuit emulator 18 over the external address bus 71. As will be appreciated by those skilled in the art, additional slave processors may be added to the system 10 of FIG. 1 for providing other internal execution parameters with only slight modification to the existing hardware.

Figure 3:
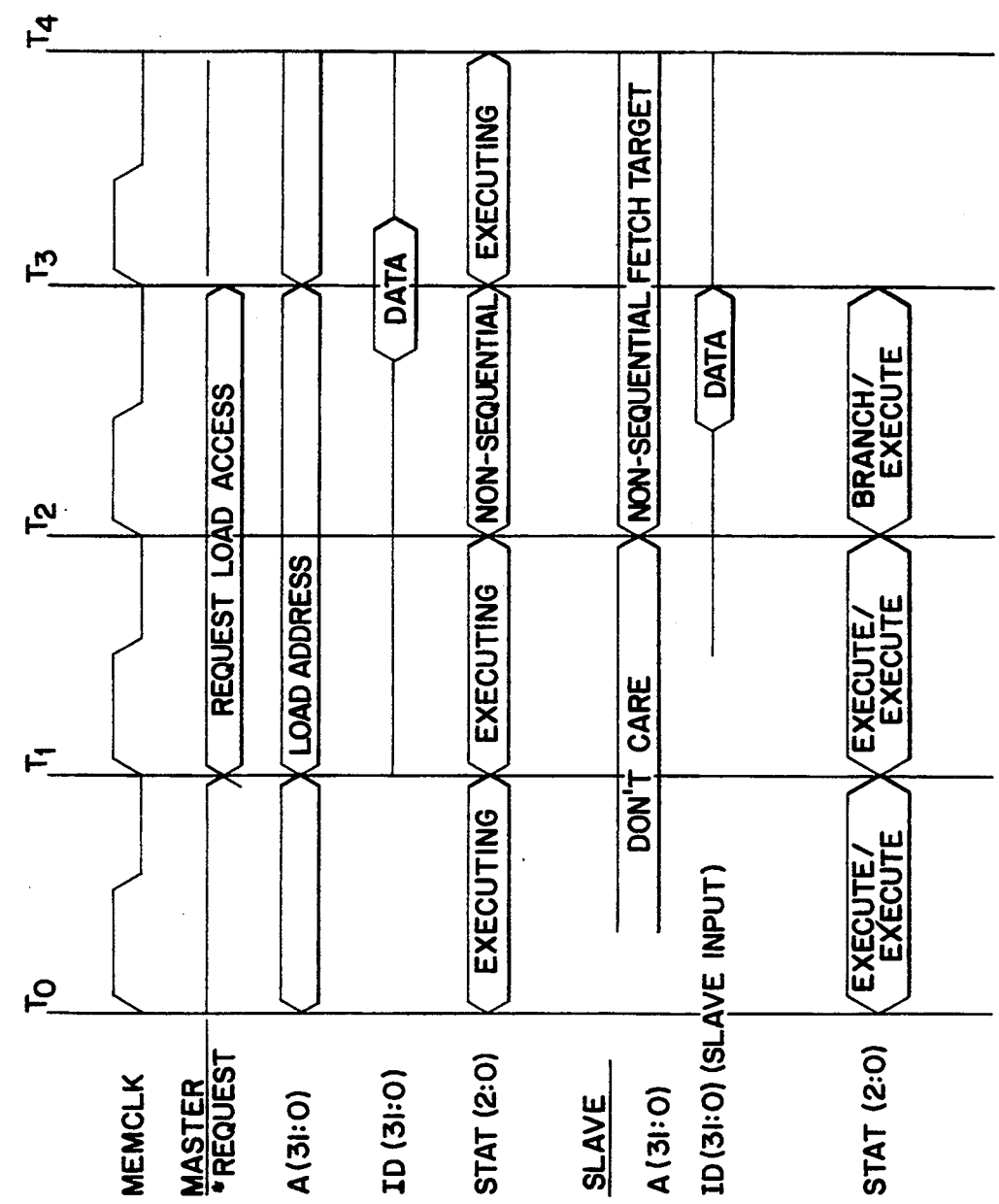
FIG. 3 is a series of wave forms illustrating the operation of the system of FIG. 1 over several clock cycles of operation of the master and slave processors.

Referring now to FIG. 3, it illustrates a series of wave forms which may be referenced to lend further understanding of the present invention. FIG. 3 illustrates four memory clock operating cycles including a first cycle from T0 to T1, a second cycle from T1 to T2, a third cycle from T2 to T3, and fourth cycle from T3 to T4. During the first cycle, the first processor 12 provides at its status output 52 an indication that it is currently executing on an instruction. At the beginning at the second cycle at T1, the first processor 12 provides a load request from its request output 20 and a load address at its address output 26. This is an external access to the external memory 16. Also during the second cycle, the first processor 12 indicates at its status output 52, that it is currently executing.

For purposes of illustration, at the beginning of the third cycle at T2, the program counters of the processors 12 and 14 issue a non-sequential fetch address to the external caches 13 and 15. However, such an internal access is not evident by the external activity of the first processor 12. However, as will be noted in the figure, at time T2 the second or slave processor 14 issues at its address output 70 the non-sequential fetch address to the internal caches which is the exact address of the caches being accessed. As a result, the in circuit emulator 18 is provided with the non-sequential fetch address and is able to track the internal executions of the processors 12 and 14.

It will be further noted in FIG. 3 that during the second half of the third cycle the external memory 16 provides the requested data responsive to the access initiated by the first processor 12 at time T1. The data appears on the external instruction/data bus 34 and is received by both the first processor 12 and the second processor 14. Also during the third cycle, the processor 12 indicates at its status output 52 that it has provided a non-sequential fetch address which, as previously mentioned, is provided by the second processor 14 at its address output 70.

During the fourth cycle, the first processor indicates at its status output 52 that it is currently executing. Also during the fourth cycle, it will be noted that the second or slave processor 14 continues to hold the non-sequential fetch address at its address output 70.

The wave forms referred to above relate to the operation of the processors 12 and 14 when in the 1× mode. The status output of the second processor from its status output 74 is not shown in FIG. 3 for this mode of operation since it would indicate the same execution status as that provided by the first processor 12. However, the bottom wave form illustrates the status indications which may be provided by the second or slave processor 14 when the processors 12 and 14 are operating in the 0.5× mode. As will be noted, during each memory clock cycle, the second processor 14 indicates the execution status of both processors for each operating cycle of the processors. Since the processors when operating in the 0.5× mode are operating at a rate which is twice the operating rate of the external memory, the second processor 14 during each memory clock cycle will indicate the execution status of the processors for two processor operating cycles. For example, during the third cycle, the second processor 14 indicates that the processors were in a branch state during the first microprocessor cycle and then in an execution state during the second microprocessor cycle of the third memory clock cycle between times T2 and T3. As a result, the second or slave processor 14 is not only able to provide an internal execution parameter externally to the processors 12 and 14, it additionally is enabled to provide an exact indication of the execution status of the processors for each operating cycle while the first processor 12 provides a status indication of the execution of the processors for each memory clock cycle.

In accordance with this preferred embodiment, each of the processors 12 and 14 is preferably an Am29030/35 microprocessor manufactured by Advanced Micro Devices. However, as will be appreciated by those skilled in the art, the present invention may be employed to advantage in association with virtually any like plurality of microprocessors.

From the foregoing, it can be seen that the present invention overcomes the difficulty in providing an in circuit emulator with all instructions that are internally being executed by a processor. In addition, by virtue of the present invention, all such instructions are provided to the in circuit emulator on a real time basis for duplicating the actual timing of the processor. In addition, additional slave processors may be added with each separately configured to provide a different key internal state to an external in circuit emulator for break-pointing purposes. This is made possible since the external address bus of a slave processor is always idle. As a result, the present invention is capable of providing an external in circuit emulator with many different internal execution parameters with the addition of a separate slave processor for each such internal execution parameter to be provided. The foregoing represents a powerful tool in verifying instructions to be executed by a processor since large on-chip caches are becoming increasingly popular for use in microprocessors In accordance with the preferred embodiment, the slave processor 14 watches and duplicates the request and instructions obtained by the master processor 12 and thus duplicates the executions of the master. At every non-sequential fetch internally on the slave processor 14, the external address bus 71 will latch the address value of the jump and drive it externally on the next memory clock cycle rising edge. As a result, the slave processor 14 will provide the external in circuit emulator with the exact address of every jump and not the pre-fetch address. It will continue to drive this value until the next non-sequential fetch is performed by the processors.

While a particular embodiment of the present invention has been shown and described, modifications may be made, and it is therefor intended to cover in the appended claims all such changes and modifications which fall within the true spirit and scope of the invention.

What is claimed is:

1. A system for providing, externally to a first processor, an internal execution parameter resulting from the execution by said first processor of internal instructions stored in an internal instruction cache of said first processor, said first processor having a multiple-bit instruction/data port coupled to an external instruction/data bus for conveying external instructions for execution, said system comprising:
   a second processor including an internal instruction cache for also storing said internal instructions, said second processor including a multiple-bit instruction/data input coupled to said instruction/data bus for receiving said external instructions to enable said second processor to duplicate the execution of said internal instructions stored in said internal instruction cache of said first processor, said second processor including an address output for providing said internal execution parameter; and
   bus means coupled to said second processor address output and being external to said first and second processors for receiving said internal execution parameter from said second processor address output and providing said internal execution parameter externally from said first and second processors, said internal execution parameter including a non-sequential fetch address to said first and second processor internal instruction caches.

2. A system as defined in claim 1 wherein said second processor includes latch means for latching said internal execution parameter at said address output.

3. A system as defined in claim 2 wherein said second processor further includes control means for detecting the occurrence of said internal execution parameter, said control means being coupled to said latch means for causing said latch means to latch said internal execution parameter.

4. A system as defined in claim 3 wherein said second processor includes an internal bus means for carrying said internal execution parameter and wherein said latch means and said control means are coupled to said internal bus means.

5. A system as defined in claim 4 wherein said second processor further includes a program counter for providing said non-sequential fetch address and wherein said program counter is coupled to said second processor internal instruction cache by said internal bus means.

6. A system as defined in claim 5 wherein said internal bus means comprises a first internal address bus for coupling said program counter to said latch means and said control means and a second internal address bus for coupling said program counter to said second processor internal instruction cache.

7. A system as defined in claim 4 wherein said second processor further includes a switch means for selectively coupling said latch means to said address output and wherein said switch means is responsive to said control means for providing said internal execution parameter to said output.

8. A system as defined in claim 1 wherein said second processor includes a status output for providing status signals indicative of the execution status of said instruction executions of said processors.

9. A system as defined in claim 8 further including an external memory for storing said external instructions, wherein said external instruction/data bus is coupled to said external memory for receiving said external instructions, and wherein said first processor is configured to fetch said external instructions from said external memory for said first and second processors.

10. A system as defined in claim 9 wherein said first and second processors are configurable for executing instructions at an operating rate which is a multiple of the operating rate of said external memory and wherein said second processor is configurable for providing, at said status output, said status signals indicative of the execution status of said processors for each operating cycle of said processors.

11. A system as defined in claim 10 wherein said first processor includes a status output for providing status signals indicative of the execution status of said instruction executions of said first processor for each operating cycle of said external memory.

12. A system as defined in claim 11 further including an in circuit emulator coupled to said external instruction/data bus for receiving said external executions from said external memory, to said second processor address output for receiving said internal execution parameter, and to said first and second processor status outputs for receiving said status signals.

13. An arrangement for verifying, with an in circuit emulator, instructions to be executed by a processor, said instructions to be executed including external instructions stored in an addressable external memory and internal instructions stored in an addressable internal instruction cache, said arrangement being arranged to provide said in circuit emulator with an internal execution parameter resulting from the execution of said internal instructions and comprising:
  a first processor including an address output for providing external memory addresses for fetching said external instructions stored in said external memory, an instruction input for receiving said external instructions fetched from said external memory, an internal instruction cache for storing said internal instructions, and a first status output coupled to said in circuit emulator for providing said in circuit emulator with execution status signals corresponding to the execution of said external and internal instructions;
  a first external address bus coupling said first processor address output to said external memory and to said in circuit emulator;
  an external instruction bus coupling said first processor instruction input and said in circuit emulator to said external memory for conveying said external instructions fetched from said external memory;
  a second processor including an instruction input coupled to said external instruction bus for receiving said external instructions fetched from said external memory and an internal instruction cache for storing said internal instructions, said first and second processors being arranged to enable said second processor to duplicate the executions by said first processor of said external and internal instructions, and said second processor further including an address output for providing said in circuit emulator with said internal execution parameter; and
  a second external address bus coupling said second processor address output to said in circuit emulator for providing said internal execution parameter to said in circuit emulator, said internal instruction parameter including a non sequential fetch address to said first and second processor internal instruction caches.

14. An arrangement as defined in claim 13 wherein said second processor includes latch means for latching said internal execution parameter at said address output.

15. An arrangement as defined in claim 14 wherein said second processor further includes control means for detecting the occurrence of said internal execution parameter, said control means being coupled to said latch means for causing said latch means to latch said internal execution parameter.

16. An arrangement as defined in claim 15 wherein said second processor includes an internal bus means for carrying said internal execution parameter and wherein said latch means and said control means are coupled to said internal bus means.

17. An arrangement as defined in claim 16 wherein said second processor further includes a program counter for providing said non-sequential fetch address and wherein said program counter is coupled to said second processor internal instruction cache by said internal bus means.

18. An arrangement as defined in claim 17 wherein said internal bus means comprises a first internal address bus for coupling said program counter to said latch means and said control means and a second internal address bus for coupling said program counter to said second processor internal instruction cache.

19. An arrangement as defined in claim 15 wherein said second processor further includes a switch means for selectively coupling said latch means to said address output and wherein said switch means is responsive to said control means for providing said internal execution parameter to said address output.

20. An arrangement as defined in claim 13 wherein said second processor includes a second status output coupled to said in circuit emulator for providing said in circuit emulator with status signals indicative of the execution status of said instruction executions of said processors.

21. An arrangement as defined in claim 20 wherein said first and second processors are configurable for executing instructions at an operating rate which is a multiple of the operating rate of said external memory and wherein said second processor is configurable for providing, at said second status output, said status signals indicative of the execution status of said processors for each operating cycle of said processors.

22. An arrangement as defined in claim 21 wherein said first processor is arranged to provide at said first status output status signals indicative of the execution status of said processor for each operating cycle of said external memory.

* * * * *